Oct. 5, 1965 F. M. BROCK ETAL 3,210,570
POLARITY RESPONSIVE SWITCHING CIRCUIT FOR REDUCING DECISION AMBIGUITY
Filed Aug. 9, 1962
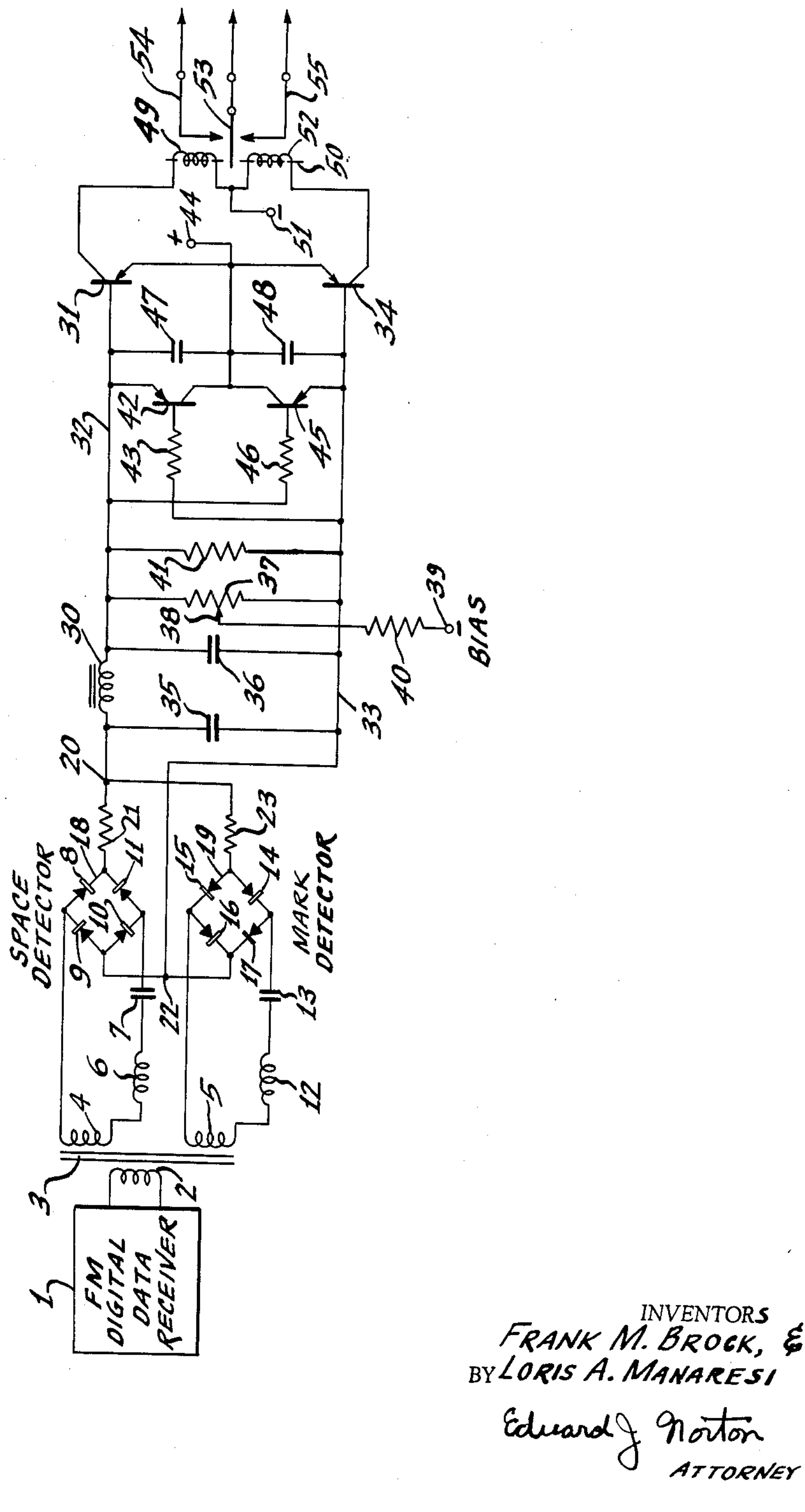
INVENTORS
FRANK M. BROCK, &
BY LORIS A. MANARESI
Edward J. Norton
ATTORNEY United States Patent Office 3,210,570

Patented Oct. 5, 1965

3,210,570

POLARITY RESPONSIVE SWITCHING CIRCUIT FOR REDUCING DECISION AMBIGUITY

Frank M. Brock, Haddonfield, and Loris A. Manaresi, Merchantville, N.J., assignors to Radio Corporation of America, a corporation of Delaware Filed Aug. 9, 1962, Ser. No. 215,905
5 Claims. (Cl. 307—88.5)

This invention relates to switching circuits. Particularly, the invention relates to an improved switching circuit for reducing decision ambiguity in the operation of a polar signal detector.

Polar signal detecting circuits are commonly used with digital data receivers of the phase or frequency modulation type. The receivers operate in response to a received signal keyed between two conditions of frequency or phase to produce a direct current output signal which reverses in polarity at each transition between the signal conditions of the received signal. The signal conditions are defined in the art as mark and space or one and zero. A decision circuit in the form of a switching circuit for operating a relay or other switchable device is responsive to the reversals in the polarity of the receiver output signal to indicate the condition or state of the digital data signal being received.

The modulated carrier signal by which the digital information is transmitted is subject to amplitude and phase distortion as it passes through the transmission medium prior to detection in the receiver. As a result of this distortion, the waveform of reversing polarity at the output of the receiver has appreciable transition time in changing from one polarity to the other according to the change in the frequency or phase of the modulated carrier being received. The transitions between one polarity and the other in the receiver output waveform thus become less sharply defined, whereby the transition time produces an ambiguity range in the operation of a decision circuit responsive to the receiver output waveform. Noise superimposed upon the data signal received by the receiver and passed through the receiver during the transition times can influence the precise time of decision made by the decision circuit as to the received signal condition.

It is an object of the invention to provide an improved switching circuit for use as a polar signal detector.

Another object is to provide an improved polar signal detecting circuit having a reduced decision ambiguity in the operation thereof.

A further object is to provide an improved polar digital detector for use in a phase or frequency modulated data system, the detector providing an output in which detection errors due to the presence of noise or other interference in the data signal are reduced and in which pulse length times derived from the periodic transitions in the data signal are more faithfully reproduced.

The foregoing objects are accomplished in accordance with the invention wherein, for example, mark and space frequency discriminators are responsive to a received frequency modulated data signal to produce across a pair of output terminals a polar direct current signal. The polar signal reverses in polarity at the data bit rate of the received frequency modulated data signal and in accordance with the information content of the data signal. The discriminators constitute a floating polar signal source in the sense that the polar signal appearing across the output terminals is not referenced to an external power supply. Separate output circuits are selectively energized for each mark and space interval as indicated by the polarity of the polar signal.

In order to reduce the transition time between detected mark and space intervals, the control elements of a bistable circuit such as a multivibrator are cross-coupled between the output terminals. The polar signal serves to drive one control element into conduction and the other element simultaneously into cut-off, providing an extremely fast transition in the driving energy for the separate output circuits, with resulting decrease in response ambiguity due to distortion introduced in the received frequency modulated data signal.

A preferred embodiment of the invention includes a pair of output transistors arranged to drive a polar relay or the like in response to the mark or space indication provided by the polar signal applied to the input electrodes of the transistors. In order to make the switching time of the output transistors more rapid, the electrodes of a second pair of transistors are cross-connected between the output terminals of the discriminators and the input electrodes of the pair of output transistors so as to provide a regenerative, bistable action. The bistable or multivibrator action in response to the reversals of polarity in the polar signal results in a rapid switching action by the pair of output transistors, reducing the ambiguity range in the transition time and thereby reducing detection errors in the detected output provided by the operation of the polar relay.

The invention will now be described in greater detail in connection with the single figure of the accompanying drawing which is a circuit diagram of one embodiment of a switching circuit constructed according to the invention.

A frequency modulated digital data signal receiver 1 is shown in the drawing. The receiver 1 is of the type adapted to receive over a radio path, a transmission line or other communication medium a signal frequency shift keyed by a digital data signal. In transmitting digital data information by such a signal, the signal is divided into equal time intervals during each of which the signal assumes one of two possible conditions or states according to the information being transmitted. In one condition, the signal interval is defined as mark, and the frequency modulated signal is of a first or mark frequency. In the other condition, defined as a space signal interval, the frequency of the signal is shifted to a second or space frequency different from the mark frequency and removed from the mark frequency an amount sufficient to permit the operation of frequency selective circuits in response to the respective mark and space frequencies. By way of example, the frequency modulated data signal received by the receiver 1 may have a center frequency of 4,300 cycles per second with a mark frequency of 4,265 cycles per second and a space frequency of 4,335 cycles per second, resulting in a frequency shift of ±35 cycles per second in the received signal.

The receiver 1 includes the usual filters, amplifiers and limiting circuits for processing the received data signal. The frequency modulated data signal after being processed in the receiver 1 is fed to the primary winding 2 of a frequency discriminator driver transformer 3. The transformer 3 includes a secondary winding 4 and a secondary winding 5. One end of the winding 4 is connected to the cathode of a crystal diode 10 and to the anode of a crystal diode 11 through a space frequency discriminating series resonant tuned circuit including inductor 6 and capacitor 7. The other side of the winding 4 is connected to the anode of a crystal diode 8 and to the cathode of a crystal diode 9. The anode of crystal diode 9 is connected to the anode of crystal diode 10, and the cathode of crystal diode 8 is connected to the cathode of crystal diode 11, forming a diode-bridge, full-wave rectifier 18.

Winding 5 is connected at one end to the anode of a crystal diode 16 and to the cathode of a crystal diode 15. The other end of winding 5 is connected to the anode of a crystal diode 17 and to the cathode of a crystal diode 14 through a mark frequency discriminating series resonant tuned circuit including inductor 12 and capacitor 13. The cathode of diode 16 is connected to the cathode of diode 17, and the anode of diode 15 is connected to the anode of diode 14, the diodes 14, 15, 16 and 17 forming a second diode-bridge, full-wave rectifier 19.

A typical space and mark frequency detecting circuit arrangement is thus provided. The value of the inductor 6 and capacitor 7 are determined so that the current flowing through the circuit including these components is peaked when a signal interval of space frequency is applied to the transformer 3 via winding 2. The values of inductor 12 and capacitor 13 are determined so that the current flow through the circuit arrangement including these components is peaked upon a signal interval of mark frequency being applied to the primary winding 2 of the transformer 3. The frequency discriminating circuits are tuned above and below the respective mark and space frequencies to provide a substantially linear response with the one frequency discriminating circuit being predominately responsive to the mark frequency and the other predominately responsive to the space frequency.

The junction of the cathode of diode 8 and the cathode of diode 11 in the rectifier 18 is connected to a terminal point 20 through a resistor 21. The junction of the anode of diode 15 and the anode of diode 14 in the rectifier 19 is also connected to the terminal point 20 through a resistor 23. A second terminal point 22 is connected to the cathodes of diodes 16, 17 in rectifier 19 and to the anodes of diodes 9, 10 in rectifier 18. The detected outputs of the rectifiers 18, 19 are additively combined across the terminal points 20, 22 with the diodes 8, 9, 10, 11 in the rectifier 18 being poled in the reverse direction with respect to the diodes 14, 15, 16, 17 in the rectifier 19. A polar direct current at the data bit rate of the frequency modulated data signal received by the receiver 1 is produced by the resistive current summing network across the terminal points 20, 22.

Terminal point 20 is connected through an inductor 30 to the base or input electrode of a PNP junction transistor 31 of N-type conductivity via lead 32. Terminal point 22 is connected via lead 33 to the base or input electrode of a second PNP junction transistor 34 of N-type conductivity. A capacitor 35 is connected from one side of inductor 30 to lead 33, and a capacitor 36 is connected from the other side of the inductor 30 to the lead 33. The capacitors 35, 36 and inductor 30 are included in a low pass filter for removing noise and carrier frequency from the polar signal appearing across terminal points 20, 22.

A variable resistor 37 connected between leads 32, 33 includes a wiper arm 38 connected to the negative terminal 39 of a source of unidirectional potential through a fixed resistor 40. Resistor 37 serves to supply a negative bias to the base electrodes of the transistors 31, 34. A damping resistor 41 is connected between the leads 32, 33 for determining the response of the transistor circuit arrangement to be described.

The emitter electrode of a third PNP junction transistor 42 of N-type conductivity is connected to the base electrode of transistor 31 and lead 32. The base electrode of transistor 42 is connected through a resistor 43 to the lead 33 and the base electrode of transistor 34. The collector electrode of transistor 42 is connected to the emitter or control electrodes of transistors 31 and 34. The emitter electrode of a fourth PNP junction transistor 45 of N-type conductivity is connected to lead 33 and the base electrode of transistor 34. The base electrode of transistor 45 is connected through a resistor 46 to the lead 32 and the base electrode of transistor 31. The collector electrode of transistor 45 is connected to emitter electrodes of transistors 31 and 34. A capacitor 47 is connected between the emitter electrode and collector electrode of transistor 42, and a capacitor 48 is connected between the collector electrode and emitter electrode of transistor 45. Capacitors 47, 48 form a part of the low pass filter including inductor 30 and capacitors 35, 36.

The emitter electrodes of transistors 31 and 34 are connected to the positive terminal 44 of a source of unidirectional potential. The collector or output electrode of transistor 31 is connected through one winding 49 of a polar relay 50 to the negative terminal 51 of a source of unidirectional potential. The collector or output electrode of the transistor 34 is connected to the negative terminal 51 through the second winding 52 of the polar relay 50. The polar relay 50 includes an armature 53 adapted to be driven between a pair of contacts 54, 55 according to which one of the windings 49, 52 is energized. Damping diodes or other means, not shown, may be connected across the windings 49, 52 to quench relay winding transients.

The potential across the terminal points 20, 22 changes from one polarity to the other according to the data bit rate of the received frequency modulated data signal. When a mark frequency signal interval is received, the detected output of the mark detector rectifier 19 predominates, and terminal point 20 is negative with respective to terminal point 22. For a received space frequency signal interval, the output of the space detector rectifier 18 predominates, and terminal point 20 is positive with respect to terminal point 22. A floating polar signal source is provided between terminal points 20 and 22.

There is a transition time during which the circulating base current of transistors 31, 34 can fall to zero and then build up in the opposite direction, if the current conducting states of transistors 31, 34 are free to follow the change in the polarity of the polar signal appearing across terminal points 20, 22. Due to distortion introduced in the signal received by the receiver 1, this transition time can be appreciable. As a result, an ambiguity range exists in the operation of transistors 31, 34 during which noise or other disturbance included with the polar signal can affect the decision made by transistors 31, 34 as to the polarity of the polar signal applied thereto. Such operation will result in the distortion of the indication provided at contacts 54, 55 of polar relay 50 as to the data information included in the received data signal.

The transition time between signal intervals in the data signal as received by the receiver 1 is for a given transmission network some function of the frequency rate at which the carrier signal is keyed by the data signal. The existence of this ambiguity range in the operation of the decision circuit can cause errors to be introduced in the transition times as indicated by the operation of the polar relay 50 at the output of the decision circuit. The transition times as indicated at the decision circuit output undergo instantaneous changes in frequency as compared to the frequency of transition times in the data signal received by the receiver 1. That is, a given transition point as indicated in the output of the decision circuit can be spaced from a preceding transition point an amount different from the spacing between the corresponding transition times in the received data signal. The length of the change of state time intervals as indicated in the output of the decision circuit are distorted as compared to the length of the signal intervals in the received data modulated carrier signal. Such distortion is undesirable in applications where equipment used in association with the data signal receiver 1 requires precise and faithful detection of the received data signal.

In the switching circuit illustrated, transistors 42 and 45 act as current steering devices whose current steering effects by the collector to emitter impedances are controlled by the base currents in the base electrode leads cross-connected between the leads 32, 33. Transistors 42, 45 are connected in a reversed-bias transistor multivibrator with a current trigger. The regenerative current trigger action brought about by the transistors 42, 45 causes the operating base current drive to the transistors 31, 34 to switch from one of the transistors 31, 34 to the other in a sudden jump or snap-action rather than passing smoothly through a zero value region. Transistors 31, 34 are not free to follow the transition time of the polar signal across terminal points 20, 22 in changing from one polarity to the other. The ambiguity range in the operation of the transistors 31, 34 is reduced, reducing detection errors in the output of the polar relay 50 due to noise or other distortion present in the polar signal.

In describing the operation of the switching circuit, it will be assumed that a space signal interval is received. The current flow through the space frequency detector is maximum compared to that in the mark frequency detector, resulting in the terminal point 20 being positive with respect to the terminal point 22. A first electrical path is completed from the terminal point 20 to the terminal point 22 including lead 32, the emitter electrode and collector electrode of transistor 42, the emitter and base electrodes of transistor 34 and lead 33. Since the emitter electrodes of transistors 42 and 34 are both biased positive or in the forward direction with respect to the base electrodes of the respective transistors, transistors 42 and 34 conduct. Resistor 43 serves to limit the base current in transistor 42. The operation of transistor 42 introduces current gain in the electrical path, causing transistor 34 to become rapidly conducting. Winding 52 of the polar relay 50 is energized, and armature 53 engages contact 55 to indicate the reception of the space signal during the interval.

A second electrical path also exists between terminal point 22 and the terminal point 20 including lead 33, the emitter electrode and collector electrode of transistor 45, the emitter and base electrodes of transistor 31, and lead 32. The emitter electrode of transistor 45 is biased negatively or in the reverse direction with respect to its base electrode, and transistor 45 is non-conducting. Transistor 45 presents a high collector-to-emitter impedance in series with the emitter-to-base electrode path through transistor 31, and transistor 31 is held non-conducting.

Assuming that the input data signal applied to receiver 1 now changes from a space to a mark frequency, the current flow in the mark detector becomes maximum with respect to that in the space detector. Terminal point 20 become negative with respect to terminal point 22, and the polarity of the polar signal appearing across terminal points 20, 22 reverses. As the potential of the polar signal decreases through zero, preparatory to reversing polarity, with terminal point 20 being positive with respect to terminal point 22, a point is reached at which the emitter electrode of transistor 42 is no longer sufficiently positive with respect to its base electrode to permit transistor 42 to conduct. Transistor 42 ceases conduction, immediately placing a high collector-to-emitter impedance in series with the emitter-to-base path of transistor 34. Transistor 34 is rapidly switched to a non-conducting state.

At the same time, the emitter electrode of transistor 45 becomes sufficiently biased positive or in a forward direction with respect to its base electrode to cause transistor 45 to conduct. A surge of current passes over the electrical path including the emitter and base electrodes of transistor 31. The base electrode of transistor 31 being now biased negatively from terminal point 20, transistor 31 is rapidly switched into a current conducting state. Winding 49 of polar relay 50 is energized, and armature 53 engages contact 54 to indicate the reception of the mark signal interval.

The switching action which takes place upon the polar signal across terminal points 20, 22 undergoing a transition in polarity to indicate a change from a mark to a space frequency signal interval in the signal received by receiver 1 is similar to that described above. Transistors 42 and 34 become conducting, the operation of transistor 42 causing a surge of current to be applied to the input electrodes of transistor 34 so as to rapidly switch transistor 34 into a current conducting state. Transistor 45 becomes non-conducting, presenting a high impedance in series with the emitter-to-base path of transistor 31 and rapidly switching transistor 31 into a non-conducting state.

The trigger point at which transistor 42, 45 reverse current conducting states is a function of the value of base resistors 43 and 46, damping resistor 41, and the variable resistor 37 by which a small negative bias potential is applied to the base electrodes of transistors 31, 34. By cross-connecting the base and emitter electrodes of the transistors 42, 45 through the resistors 43 and 46, a rapid, regenerative, multivibrator switching action results. Upon one of the transistors 42 or 45 becoming conducting, the other immediately becomes non-conducting. The ambiguity range during which transistors 31, 34 determine the polarity of the polar signal across terminal points 20, 22 is reduced, reducing detection errors in the output provided by the polar relay 50.

Capacitors 47, 48 are added as a further protection against noise affecting the decision made by the transistors 31, 34 as to the polarity of the polar signal across terminal points 20, 22. Even though the switching action is rapid, noise received exactly at the time that the switching is taking place can adversely affect the decision made. By assuming a charged condition according to which of the transistors 42, 45 was last current conducting, the capacitors 47, 48 serve to apply a bias between the base and emitter electrodes of transistors 31 and 34, respectively, sufficient to hold transistors 31, 34 substantially non-responsive to noise received during the switching interval. The presence of the capacitors 47, 48 will tend to slow down somewhat the response of transistors 31, 34 to the operation of transistors 42, 45. In determining the value of the capacitors 47 and 48, a compromise is reached between the switching speed and the noise immunity desired.

The wiper arm 38 on resistor 37 serves as an output pulse bias control. The setting of the wiper arm 38 determines the negative direct current bias applied to the base electrodes of transistors 31, 34, as well as to the input electrodes of transistors 42 and 45, and, therefore, the response of the transistors 31, 34 to the polar signal applied thereto. The average collector currents of the transistors 31, 34 can be inversely adjusted for a given periodic-type pulse signal received to provide an output via polar relay 50 in which the signal intervals are a faithful reproduction of the data pulse intervals in the received signal.

A polar signal detecting circuit is provided by the use of the switching circuit of the invention which is particularly suitable for use in multi-channel frequency or phase modulating data systems. Distortion in the detected outputs of the polar signal detecting circuits due to cross-talk between the channels in minimized.

Instead of using PNP junction transistors as shown in the drawing, NPN junction transistors of P-type conductivity may be used by altering the connections to the electrodes of the transistors to provide suitable operating biasing in a known manner. Also, the invention is not limited to the use of a polar relay as the output device. The output signals appearing at the collector electrodes of transistors 31, 34 can be used either as single-ended inputs or as a push-pull input to a succeeding stage responsive thereto.

By way of example, a switching circuit was constructed for use in a frequency modulated data system in which the space frequency was 4335 cycles per second and the mark frequency was 4265 cycles per second, the center or carrier frequency being 4300 cycles per second. The received signal was keyed at a repetitive rate of 37.5 cycles per second. The frequency discriminating circuits including inductors 6, 12 and capacitors 7, 13 were adjusted to provide a substantially linear response to the respective space and mark frequencies. A minus 24 volts direct current was supplied at terminals 39 and 51, the terminal 44 acting as a return path to the positive side of the voltage source. The various components were of the following values.

| | | |
|---|---|---|
| Transistors 31, 34, 42, 45 | | 2N404 |
| Diodes 8, 9, 10, 11, 14, 15, 16, 17 | | 1N96 |
| Resistors 21, 23 | ohms | 75 |
| Capacitor 35 | microfarads | 10 |
| Inductor 30 | millihenries | 600 |
| Capacitor 36 | microfarads | 5 |
| Resistor 41 | ohms | 820 |
| Resistor 37 | do | 1000 |
| Resistor 40 | do | 11,500 |
| Resistors 43, 46 | do | 180 |
| Capacitors 47, 48 | microfarads | 5 |

What is claimed is:

1. A switching circuit comprising, in combination, first and second junction transistors each including a base, emitter and collector electrode, means for applying a polar direct current signal of reversing polarity to said base electrodes so that the polarity of said signal as applied to the base electrode of said first transistor is opposite to the polarity of said signal as applied to the base electrode of said second transistor, means for connecting said electrodes to a source of proper operating bias potentials to cause one of said transistors to conduct and the other of said transistors to be non-conducting according to the polarity of said signal, third and fourth junction transistors each including a base, emitter and collector electrode, means connecting said emitter electrode of said third transistor and said base electrode of said fourth transistor to said base electrode of said first transistor, means connecting said emitter electrode of said fourth transistor and said base electrode of said third transistor to said base electrode of said second transistor, means for connecting said collector electrode of said third transistor to said emitter electrode of said second transistor and for connecting said collector electrode of said fourth transistor to said emitter electrode of said first transistor, said electrodes of said third and said fourth transistors being cross-connected between said base and said emitter electrodes of said first and said second transistors to produce a regenerative current trigger action for rapidly reversing the current conducting state of first and second transistors upon a reversal in the polarity of said signal.

2. A switching circuit for use as a polar signal detecting circuit, comprising, in combination, first and second PNP junction transistors each including a base, emitter and collector electrode, means for applying a polar direct current signal of reversing polarity to said base electrodes so that the polarity of said signal as applied to the base electrode of said first transistor is opposite to the polarity of said signal as applied to the base electrode of said second transistor, third and fourth PNP junction transistors each including a base, emitter and collector electrode, first and second resistors, means connecting said emitter electrode of said third transistor directly to said base electrode of said first transistor, means connecting said base electrode of said fourth transistor through said first resistor to said base electrode of said first transistor, means connecting said emitter electrode of said fourth transistor directly to said base electrode of said second transistor, means connecting said base electrode of said third transistor through said second resistor to said base electrode of said second transistor, means for connecting said collector electrode of said third transistor directly to said emitter electrode of said second transistor and for connecting said collector electrode of said fourth transistor directly to said emitter electrode of said first transistor, a polar relay including first and second windings, means for connecting said first winding in series with a source of unidirectional potential between said collector and said emitter electrodes of said first transistor, and means for connecting said second winding in series with said source between said collector and said emitter electrodes of said second transistor, said source being arranged to provide the proper operating bias potentials to cause one of said first and second transistors to conduct current through the winding connected in series therewith and the other of said first and second transistors to be non-conducting according to the polarity of said signal.

3. A switching circuit comprising, in combination, first and second junction transistors each including a base, emitter and collector electrode, first and second input terminals, means to develop across said terminals a polar direct current signal of reversing polarity so that the polarity of said signal at one of said terminals is opposite to the polarity of said signal at the other of said terminals, third and fourth junction transistors each including a base, emitter and collector electrode, means for completing a first electrical path between said terminals including in series said emitter and said collector electrodes of said third transistor and said emitter and said base electrodes of said second transistor, means for completing a second electrical path between said terminals including in series said emitter and said collector electrodes of said fourth transistor and said emitter and said base electrodes of said first transistor, means connecting said emitter electrode of said third transistor and said base electrode of said fourth transistor to said base electrode of said first transistor, means connecting said emitter electrode of said fourth transistor and said base electrode of said third transistor to said base electrode of said second transistor, and means for connecting the electrodes of said first and second transistors to a source of the proper operating bias potentials to cause current flow over only one of said electrical paths according to the polarity of said signal as applied to said terminals.

4. A switching circuit comprising, in combination, first and second junction transistors of the same type of conductivity each including a base, emitter and collector electrode, first and second input terminals, means to develop across said terminals a polar direct current signal of reversing polarity so that the polarity of said signal at one of said terminals is opposite to that at the other of said terminals, third and fourth junction transistors each including a base, emitter and collector electrode and of the same type of conductivity as said first and second transistors, means for completing a first electrical path between said terminals including in order said emitter and said collector electrodes of said third transistor and said emitter and said base electrodes of said second transistor, means for completing a second electrical path between said terminals including in order said emitter and said collector electrodes of said fourth transistor and said emitter and said base electrodes of said first transistor, first and second resistors, means connecting said emitter electrode of said third transistor directly to said base electrode of said first transistor, means connecting said base electrode of said fourth transistor through said first resistor to said base electrode of said first transistor, means connecting said emitter electrode of said fourth transistor directly to said base electrode of said second transistor, means connecting said base electrode of said third transistor through said second resistor to said base electrode of said second transistor, and means for connecting the electrodes of said first and second transistors to a source of the proper operating bias potentials to cause current flow over only one of said electrical paths according to the polarity of said signal as applied to said terminals, said third and said fourth transistors forming a reversed-bias multivibrator producing a regenerative current trigger action for rapidly reversing the current conducting condition of said electrical paths upon a reversal in the polarity of said signal.

5. In combination, first and second PNP junction transistors each including a base, emitter and collector electrode, means connected between said base electrodes adapted to receive a frequency modulated data signal and to convert said data signal into a polar direct current signal for application to said base electrodes so that the polarity of said polar signal as applied to the base electrode of said first transistor is opposite to the polarity of said polar signal as applied to the base electrode of said second transistor, said polar signal being characterized by reversing polarity at the data bit rate in said data signal and according to the information carried by said data signal, means for connecting said electrodes to a source of proper operating bias potentials to cause one of said transistors to conduct and the other of said transistors to be non-conducting according to the polarity of said polar signal, third and fourth PNP junction transistors each including a base, emitter and collector electrode, first and second resistors, means connecting said emitter electrode of said third transistor directly to said base electrode of said first transistor, means connecting said base electrode of said fourth transistor through said first resistor to said base electrode of said first transistor, means connecting said emitter electrode of said fourth transistor directly to said base electrode of said second transistor, means connecting said base electrode of said third transistor through said second resistor to said base electrode of said second transistor, means connecting said collector electrodes of said third and fourth transistors together and to said emitter electrodes of said first and second transistors, said electrodes of said third and said fourth transistors being cross-connected between said base and said emitter electrodes of said first and said second transistors to produce a regenerative current trigger action for rapidly reversing the current conducting state of said first and second transistors upon a reversal in the polarity of said signal, and an output circuit connected to said collector electrodes of said first and said second transistors and responsive to the current conducting states of said first and said second transistors.

References Cited by the Examiner

UNITED STATES PATENTS

| | | | |
|---|---|---|---|
| 2,963,658 | 12/60 | Rochelle ------------ | 307—88.5 |
| 3,065,388 | 11/62 | Pincakers ------------ | 307—88.5 |
| 3,074,020 | 1/63 | Ropiquet ------------ | 307—88.5 |
| 3,078,379 | 2/63 | Plogstedt et al. ---------- | 330—14 |

JOHN W. HUCKERT, *Primary Examiner.*

ARTHUR GAUSS, *Examiner.*